(12) United States Patent
Rajkotia

(10) Patent No.: US 7,974,644 B2
(45) Date of Patent: *Jul. 5, 2011

(54) APPARATUS AND METHOD FOR REDUCING CALL SET-UP TIME FOR TIME-SENSITIVE APPLICATIONS IN A WIRELESS NETWORK

(75) Inventor: Purva R. Rajkotia, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 650 days.

This patent is subject to a terminal disclaimer.

(21) Appl. No.: 12/004,215

(22) Filed: Dec. 20, 2007

(65) Prior Publication Data

US 2008/0108375 A1 May 8, 2008

Related U.S. Application Data

(62) Division of application No. 11/088,703, filed on Mar. 24, 2005, now Pat. No. 7,336,965.

(60) Provisional application No. 60/575,609, filed on May 27, 2004.

(51) Int. Cl.
*H04W 68/00* (2009.01)

(52) U.S. Cl. ........ 455/458; 455/434; 455/518; 370/329; 370/335; 370/438

(58) Field of Classification Search .................. 455/518, 455/517, 519, 458
See application file for complete search history.

(56) References Cited

U.S. PATENT DOCUMENTS

| | | | |
|---|---|---|---|
| 7,260,414 B2 * | 8/2007 | Hassan et al. ................. | 455/518 |
| 7,398,095 B2 * | 7/2008 | Hassan et al. ................. | 455/518 |
| 2002/0173326 A1 * | 11/2002 | Rosen et al. .................. | 455/518 |
| 2003/0119539 A1 * | 6/2003 | Needham et al. ............. | 455/518 |
| 2003/0148764 A1 | 8/2003 | Kelley | |
| 2003/0148779 A1 * | 8/2003 | Aravamudan et al. ........ | 455/519 |
| 2003/0202487 A1 | 10/2003 | Harris et al. | |
| 2004/0057405 A1 * | 3/2004 | Black ............................ | 370/335 |
| 2005/0041625 A1 | 2/2005 | Brewer | |
| 2005/0044256 A1 * | 2/2005 | Saidi et al. .................... | 709/232 |
| 2005/0122937 A1 * | 6/2005 | Hart et al. ..................... | 370/335 |
| 2005/0124367 A1 | 6/2005 | Hassan et al. | |
| 2005/0169223 A1 | 8/2005 | Crocker et al. | |

* cited by examiner

*Primary Examiner* — David Q Nguyen

(57) ABSTRACT

For use in a wireless network, a base station that reduces the call set-up time for a time-sensitive application. The base station comprises a message controller for receiving an incoming control message that initiates the time-sensitive application in a mobile station. In lieu of a conventional page message, the message controller transmits a short data burst message to the mobile station to initiate the time-sensitive application. The short data burst message is transmitted in a forward control channel. The mobile station completes the set-up by transmitting back an L2 Acknowledgment message in lieu of a conventional page response message.

20 Claims, 7 Drawing Sheets

700

| FIELD | LENGTH |
|---|---|
| CONFIG_MSG_SEQ | 6 |
| ACC_MSG_SEQ | 6 |
| CLASS_0_DONE | 1 |
| CLASS_1_DONE | 1 |
| TMSI_DONE | 1 |
| ORDERED_TMSIS | 1 |
| BROADCAST_DONE | 1 |
| RESERVED | 4 |
| ADD_LENGTH | 3 |
| ADD_PFIELD | 8 x ADD_LENGTH |
| BURST_TYPE | 8 |
| NUM_MSGS | 6 |
| NUM_FIELDS | 8 |
| CHAR(1) | 8 |
| CHAR(2) | 8 |
| ⋮ | ⋮ |
| CHAR(i) | 8 |

APPARATUS AND METHOD FOR REDUCING CALL SET-UP TIME FOR TIME-SENSITIVE APPLICATIONS IN A WIRELESS NETWORK

CROSS-REFERENCE TO RELATED APPLICATION AND CLAIM OF PRIORITY

The present application is a divisional patent application of U.S. patent application Ser. No. 11/088,703, filed Mar. 24, 2005, now U.S. Pat. No. 7,336,965 entitled "APPARATUS AND METHOD FOR REDUCING CALL SET-UP TIME FOR TIME-SENSITIVE APPLICATIONS IN A WIRELESS NETWORK" which claims benefit of U.S. Provisional Patent Application No. 60/575,609, filed May 27, 2004.

TECHNICAL FIELD OF THE INVENTION

The present invention relates generally to wireless networks and, more specifically, to a mechanism for reducing the call set-up time for guaranteed time-sensitive applications in a wireless network.

BACKGROUND OF THE INVENTION

The use of cellular telephones and wireless networks has become increasingly widespread. As the use of cellular telephones has increased, the number and quality of additional features made available with the cellular telephones has also increased. For example, many mobile stations (i.e., cellular telephones) now provide chat applications, such as a Push-To-Talk service, for example. Push-to-Talk (PT) service is a "walkie-talkie" type of feature that allows a mobile station user to communicate with another mobile station user (or users) by pushing a single button on the cell phone.

Chat applications, such as Push-To-Talk (PTT) service, are useful for situations in which a user wants or needs to communicate with the same person or group of people repeatedly but not continuously. For example, a group of people at a mall may desire to keep in touch with each other after they split up to shop separately. Using Push-To-Talk, one person may quickly contact another person or other people without having to make a conventional cellular phone call.

The parties involved must first establish a PTT service between their respective phones. The wireless network is then aware of the presence of each mobile station (e.g., cell phone) involved in the PTT service, although no traffic channels are set up. The mobile stations initially communicate with the base stations of the wireless network using only overhead control channels to establish the PTT service. Once the PTT service is established, the call originator does not have to dial the number of the called party in order to communicate. The call originator only needs to press a button, wait for a beep (or a similar indicator), and then speak. Advantageously, many service providers do not charge these conversations against the users' allotted usage minutes for the cellular telephones.

Many conventional wireless network, such as code division multiple access (CDMA) systems, are designed under a switched voice model. Therefore, a set-up time of several seconds is deemed acceptable to user expectations. However, as CDMA and other conventional wireless protocols are increasingly used for time-sensitive services, faster call set-up times are required. As CDMA and other protocols have evolved to serve packet data needs, the paging procedures of those protocols have changed only slightly. As a result, the paging delays experienced in CDMA2000 packet data sessions are detrimental to user latency and network efficiency.

Currently, in CDMA2000 systems, the time set-up for real-time services such as chat includes the delays associated with the call originator sending the request to the base station, the base station sending the request to the chat server, the target base station paging the target mobile station, and the target mobile station acknowledging receipt of the paging message. One of the largest delays in this string of transactions is the time required for paging the target mobile station and for the target mobile station to acknowledge with a page response message. This delay alone may consume up to 500 milliseconds.

Therefore, there is a need in the art for improved wireless networks that have reduce call set-up time for time-sensitive applications. In particular, there is a need for a CDMA2000 wireless network that provides reduce call set-up times for chat and Push-To-Talk services.

SUMMARY OF THE INVENTION

The present invention provides a technique for reducing the overall call set-up time for real-time or time-sensitive services by optimizing the paging procedure at the target base station. The present invention overcomes the shortcomings of the prior art by modifying and/or eliminating the Page message and the Page Response message. The latency reduction achieve by the present invention may be anywhere from 500 milliseconds to 1 second.

To address the above-discussed deficiencies of the prior art, it is a primary object of the present invention to provide, for use in a wireless network, a base station capable of reducing the call set-up time for a time-sensitive application. According to an advantageous embodiment of the present invention, the base station comprises a message controller capable of receiving an incoming control message operable to initiate the time-sensitive application in a first of the plurality of mobile stations, wherein the message controller transmits a short data burst message to the first mobile station to initiate the time-sensitive application in the first mobile station.

According to one embodiment of the present invention, the short data burst message is transmitted in a forward control channel of the wireless network.

According to another embodiment of the present invention, wherein the base station further comprises a memory capable of storing mobile station information associated with the first mobile station, the mobile station information comprising at least one of operating parameter information and location information associated with the first mobile station.

According to still another embodiment of the present invention, the message controller is further capable of determining if the mobile station information associated with the first mobile station is stored in the memory.

According to yet another embodiment of the present invention, the message controller, in response to a determination that the mobile station information associated with the first mobile station is stored in the memory, transmits only the short data burst message to the first mobile station in order to initiate the time-sensitive application in the first mobile station.

According to a further embodiment of the present invention, the message controller is capable of receiving from the first mobile station a Layer 2 Acknowledgment message responding to the short data burst message.

According to a still further embodiment of the present invention, the message controller, in response to a determination that the mobile station information associated with the first mobile station is not stored in the memory, transmits to the first mobile station the short data burst message and a modified Page message appended to the short data burst message in order to initiate the time-sensitive application in the first mobile station, wherein the modified Page message requests at least a portion of the mobile station information from the first mobile station.

According to a yet further embodiment of the present invention, the message controller is capable of receiving from the first mobile station a Layer 2 Acknowledgment message and a Page Response message appended to the Layer 2 Acknowledgment message, wherein the Page Response message comprises the requested at least a portion of the mobile station information.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts:

FIG. 7 illustrates a modified Page message according to an exemplary embodiment of the present invention.

DETAILED DESCRIPTION OF THE INVENTION

FIGS. 1 through 7, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
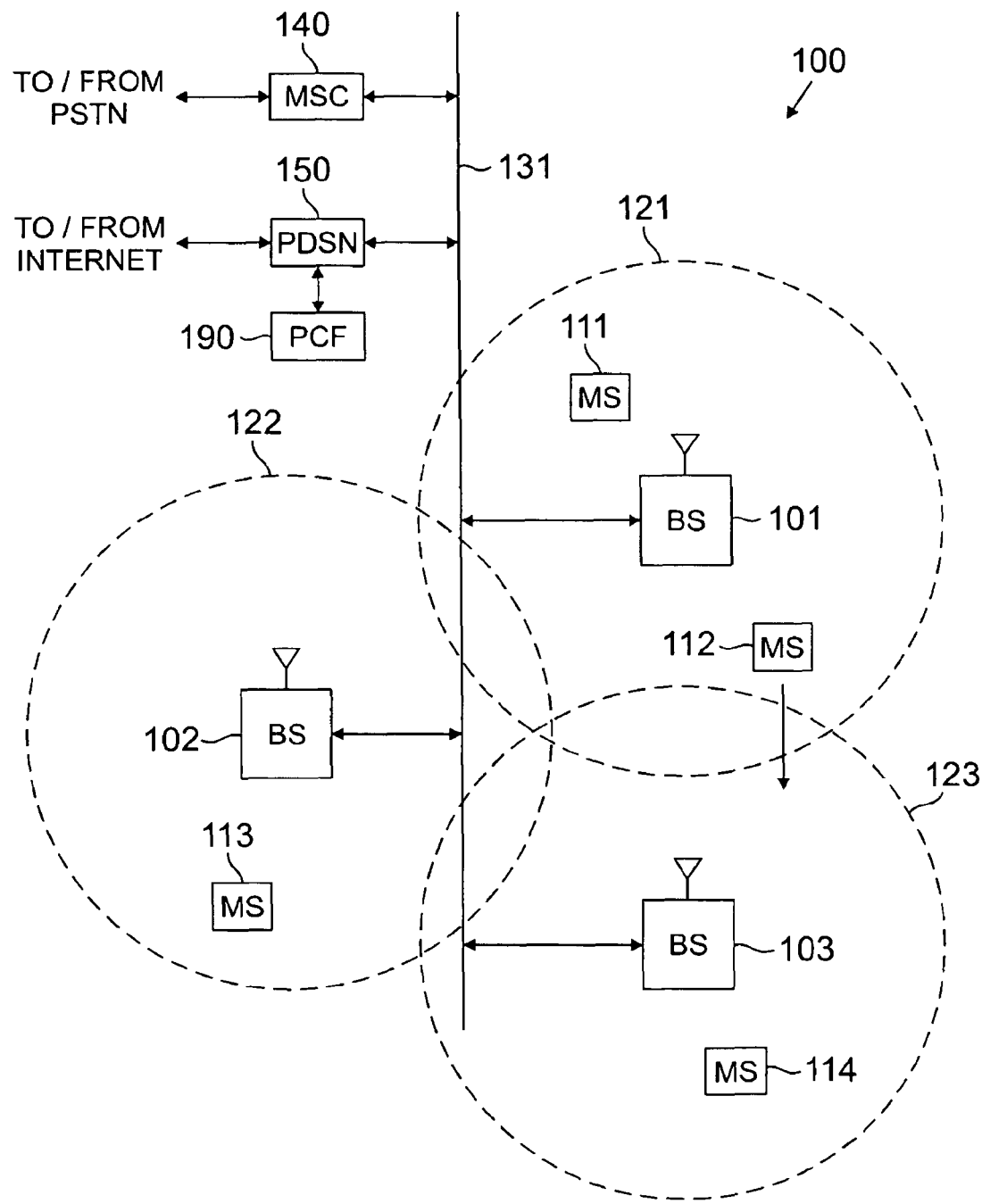
FIG. 1 illustrates an exemplary wireless network that reduces the call set-up time for guaranteed time-sensitive applications according to the principles of the present invention.

FIG. 1 illustrates exemplary wireless network 100, which reduces the call set-up time for time-sensitive applications according to the principles of the present invention. Wireless network 100 comprises a plurality of cell sites 121-123, each containing one of the base stations, DS 101, BS 102, or BS 103. Base stations 101-103 communicate with a plurality of mobile stations (MS) 111-114 over code division multiple access (CDMA) channels according to, for example, the IS-2000 standard (i.e., CDMA2000). In an advantageous embodiment of the present invention, mobile stations 111-114 are capable of receiving data traffic and/or voice traffic on two or more CDMA channels simultaneously. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

The present invention is not limited to mobile devices. The present invention also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless lap tops) and stationary wireless terminals (e.g., a machine monitor with wireless capability).

Dotted lines show the approximate boundaries of cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, each of cell sites 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present invention is not limited to any particular cell site configuration.

In one embodiment of the present invention, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. ES 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. The connections on line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

According to an advantageous embodiment of the present invention, wireless network 100 provides certain time-sensitive services to mobile stations 111-114. In particular, wireless network 100 is capable of providing a chat service, such as Push-To-Talk (PTT) service, between an originating mobile station and a target mobile station. The PTT service requires fast set-up times in order to provide the chat service in a real-time manner. The present invention provides a technique for reducing the overall call set-up time for real-time/time-sensitive services by optimizing the paging procedure at the target base station.

Figure 2:
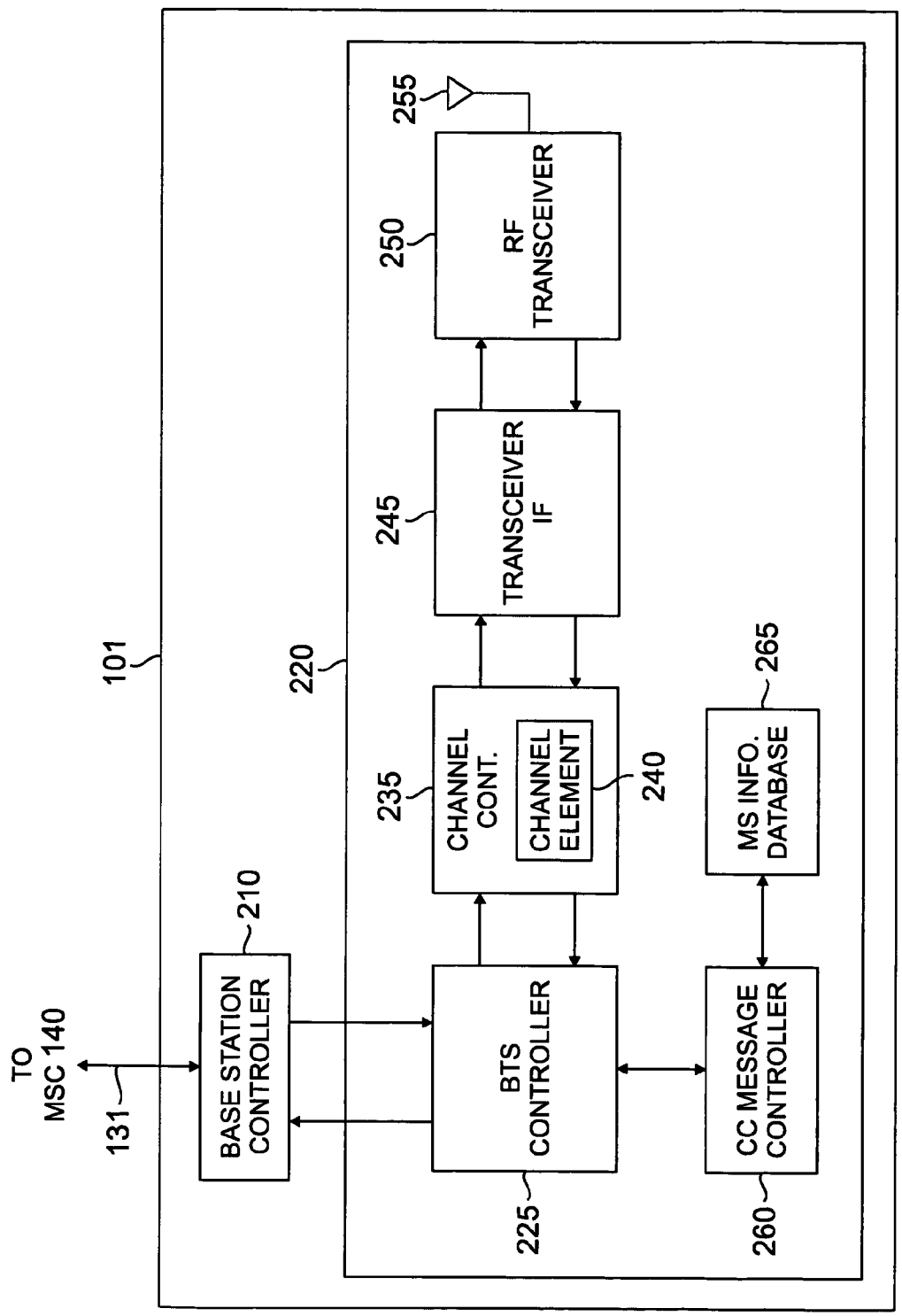
FIG. 2 illustrates an exemplary base station that reduces the call set-up time for guaranteed time-sensitive applications according to the principles of the present invention.

FIG. 2 illustrates in greater detail exemplary base station 101, which reduce the call set-up time for guaranteed time-sensitive applications according to the principles of the present invention. Base stations 102 and 103 are identical to base station 101 and are not described separately. Base station 101 comprises base station controller (BSC) 210 and base transceiver station (BTS) 220. Base station controllers and base transceiver stations were described previously in connection with FIG. 1. ESC 210 manages the resources in cell site 121, including BTS 220. BTS 120 comprises BTS controller 225, channel controller 235 (which contains representative channel element 240), transceiver interface (IF) 245, RF transceiver 250, antenna array 255, control channel (CC) message controller 260, and mobile station (MS) information database 265.

BTS controller 225 comprises processing circuitry and memory capable of executing an operating program that controls the overall operation of BTS 220 and communicates with BSC 210. Under normal conditions, BTS controller 225 directs the operation of channel controller 235, which contains a number of channel elements, including channel element 240, that perform bi-directional communications in the forward channel and the reverse channel. A "forward" channel refers to outbound signals from the base station to the mobile station and a "reverse" channel refers to inbound signals from the mobile station to the base station. Transceiver IF 245 transfers the bi-directional channel signals between channel controller 240 and RF transceiver 250.

Antenna array 255 transmits forward channel signals received from RF transceiver 250 to mobile stations in the coverage area of BS 101. Antenna array 255 also sends to RF transceiver 250 reverse channel signals received from mobile stations in the coverage area of BS 101. In a preferred embodiment of the present invention, antenna array 255 is multi-sector antenna, such as a three-sector antenna in which each antenna sector is responsible for transmitting and receiving in a 120° arc of coverage area. Additionally, RF transceiver 250 may contain an antenna selection unit to select among different antennas in antenna array 255 during both transmit and receive operations.

Control channel (CC) message controller 260 is responsible for communicating with mobile stations in the common control channels and for setting up call sessions, including Push-To-Talk sessions, between mobile stations according to the principles of the present invention. In an exemplary embodiment of the present invention, control channel message controller 260 may be implemented as one of the functions of BTS controller 225. However, for the purposes of clarity and simplicity in explaining the operation of the present invention, control channel message controller 260 is shown in FIG. 2 as a separate unit from BTS controller 225.

Mobile station (MS) information database 265 stores ID and parameter information about mobile stations that are communicating with base station 101. The fact that base station 101 stores mobile station parameters and other information enables the present invention to eliminate the paging mechanism, especially the page response message, as described below in greater detail.

Figure 3:
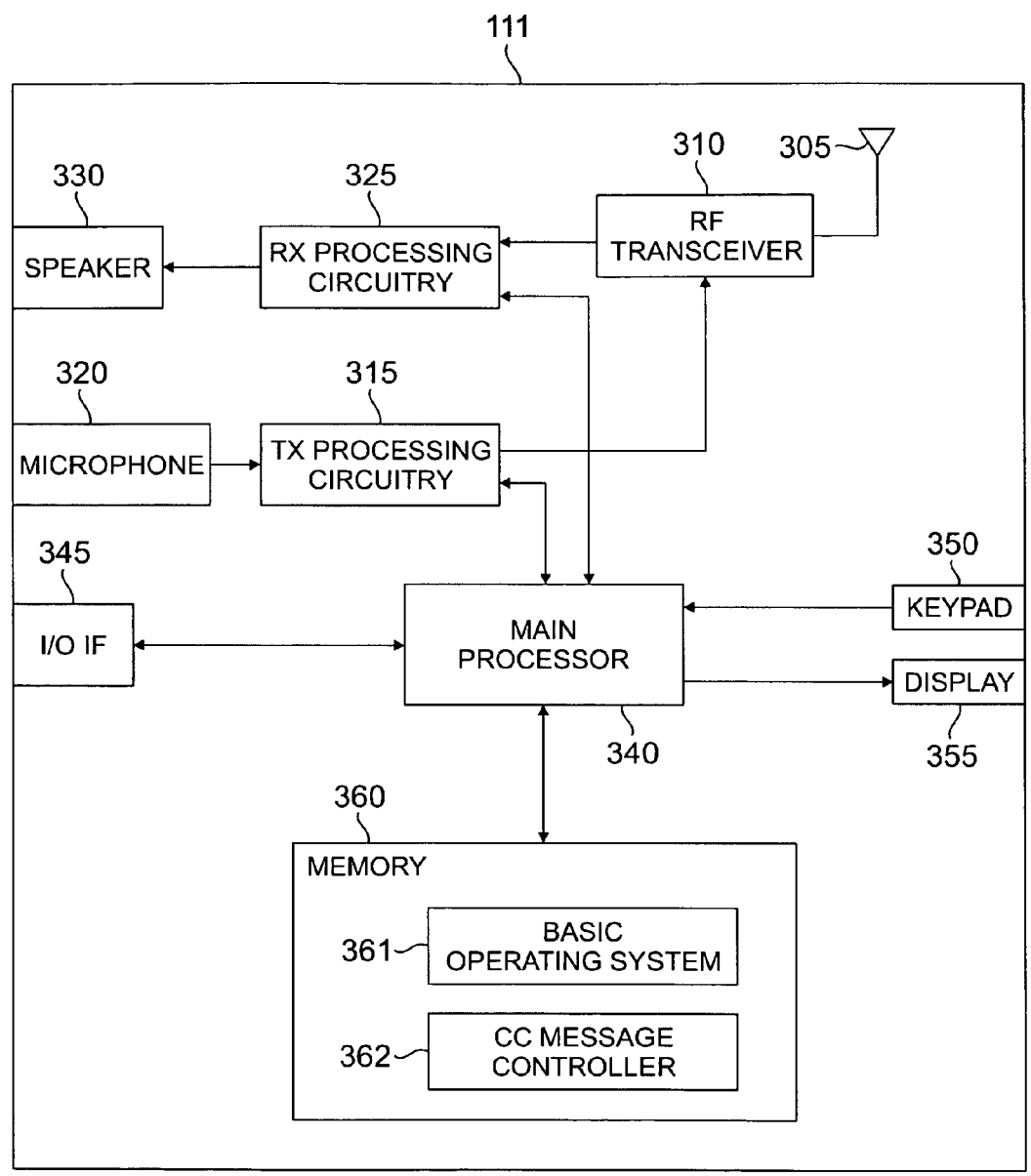
FIG. 3 illustrates an exemplary mobile station that reduces the call set-up time for guaranteed time-sensitive applications according to the principles of the present invention.

FIG. 3 illustrates in greater detail exemplary mobile station 111, which reduces the call set-up time for guaranteed time-sensitive applications according to the principles of the present invention. Mobile stations 112-114 are identical to mobile station 111 and are not described separately. Wireless mobile station 111 comprises antenna 305, radio frequency (RF) transceiver 310, transmit (TX) processing circuitry 315, microphone 320, and receive (RX) processing circuitry 325. MS 111 also comprises speaker 330, main processor 340, input/output (I/O) interface (IF) 345, keypad 350, display 355, and memory 360. Memory 360 further comprises basic operating system (OS) program 361 and control channel (CC) message controller application 262.

Radio frequency (RF) transceiver 310 receives from antenna 305 an incoming RF signal transmitted by a base station of wireless network 100. Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver (RX) processing circuitry 325 transmits the processed baseband signal to speaker 330 (i.e., voice data) or to main processor 340 for further processing (e.g., web browsing).

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RF) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via antenna 305.

In an advantageous embodiment of the present invention, main processor 340 is a microprocessor or microcontroller. Memory 360 is coupled to main processor 340. According to an advantageous embodiment of the present invention, part of memory 360 comprises a random access memory (RAM) and another part of memory 360 comprises a Flash memory, which acts as a read-only memory (ROM).

Main processor 340 executes basic operating system (OS) program 361 stored in memory 360 in order to control the overall operation of wireless mobile station 111. In one such operation, main processor 340 controls the reception of forward channel signals and the transmission of reverse channel signals by radio frequency (RF) transceiver 310, receiver (RX) processing circuitry 325, and transmitter (TX) processing circuitry 315, in accordance with well-known principles.

Main processor 340 also executes control channel (CC) message controller program 362. Control channel message controller program 362 is responsible for communicating with base station in the common control channels and for setting up a call session, including a Push-To-Talk session, with another mobile station via at least one base station according to the principles of the present invention. In an exemplary embodiment of the present invention, control channel message controller program 362 may be implemented as one of the functions of basic operating system program 361. However, for the purposes of clarity and simplicity in explaining the operation of the present invention, control channel message controller program 362 is shown in FIG. 3 as a separate entity from basic operating system program 361.

Main processor 340 is capable of executing other processes and programs resident in memory 360. Main processor 340 can move data into or out of memory 360, as required by an executing process. Main processor 340 is also coupled to I/O interface 345. I/O interface 345 provides mobile station 111 with the ability to connect to other devices such as laptop computers and handheld computers. I/O interface 345 is the communication path between these accessories and main controller 340.

Main processor 340 is also coupled to keypad 350 and display unit 355. The operator of mobile station 111 uses keypad 350 to enter data into mobile station 111. Display 355 may be a liquid crystal display capable of rendering text and/or at least limited graphics from web sites. Alternate embodiments may use other types of displays.

Figure 4:
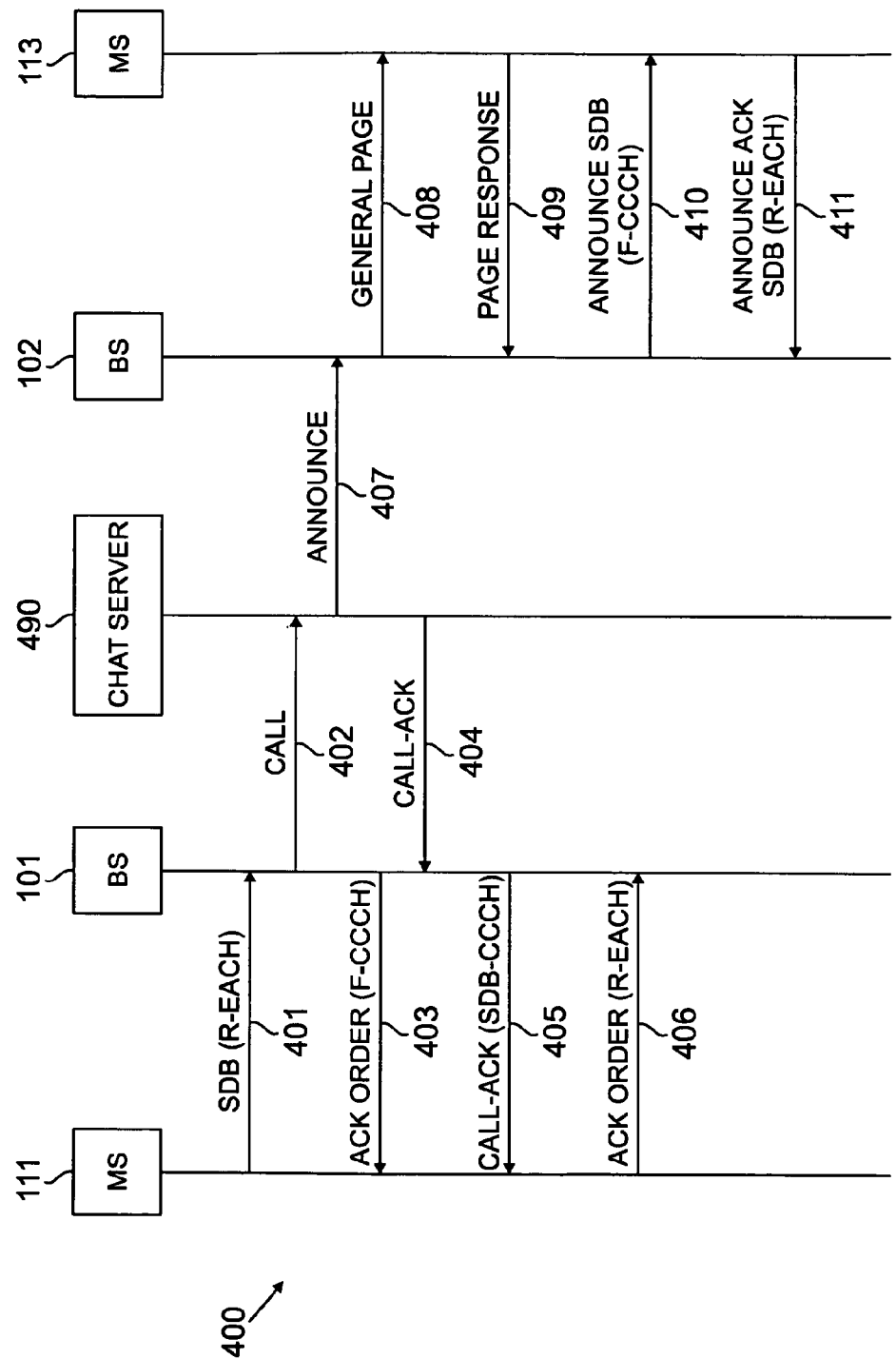
FIG. 4 is a flow diagram illustrating a conventional call set-up operation according to one embodiment of the prior art.

FIG. 4 depicts flow diagram 400, which illustrates a conventional call set-up operation according to an exemplary embodiment of the prior art. In FIG. 4, it is assumed that mobile station (MS) 111 has already accessed base station (ES) 101 and mobile station (MS) 113 has already accessed base station (BS) 102. It is further assumed that the operator of MS 111 initiates (or originates) a chat service (i.e., PTT) to MS 113. Chat server 490 provides Push-to-Talk (PTT) service, or a similar service, to mobile stations in wireless network 100. Chat server 490 may be part of wireless network 100. Alternatively, wireless network 100 may access chat server 490 via the Internet.

A PTT session is initiated when originating mobile station 111 transmits short data burst (SDB) message 401 in a reverse enhanced access channel (R-EACH) to originating base station (ES) 101. In response, BS 101 transmits Acknowledgment Order message 402 in a forward common control channel (F-CCCH) to BS 111. BS 101 also transmits Call message 403 to chat server 490. Call message 403 contains information identifying both the originating device (MS 111) and the target device (MS 113) to chat server 490.

In response to Call message 402, chat server 490 transmits Call Acknowledgment message 404 back to BS 101. BS 101 then transmits Call Acknowledgment message 405 to MS 111, using, for example, a short data burst (SDB) message in a common control channel (CCCH). Finally, MS 111 transmits Acknowledgment Order 406 a reverse enhanced access channel (R-EACH) to originating BS 101.

In response to Call message 415, chat server 490 also transmits Announce message 407 to target base station (BS) 102. BS 102 then begins setting up a call session with target MS 113. BS 102 transmits general Page message 408 to MS 113. MS 113 responds by transmitting Page Response message 409 back to BS 102. BS 102 then sends Announce message 410 as a short data burst (SDB) message in a forward common control channel (F-CCCH). Finally, in response to Announce message 410, MS 113 transmits Announce Acknowledgment message 411 as a short data burst (SDB) message in a reverse enhanced access channel (R-EACH).

However, from the time that MS 113 receives general Page message 408 to the time that BS 102 receives Announce Acknowledgment message 411, there may be at least one second of latency. The present invention reduces this latency by 500 milliseconds or more by eliminating some of the paging operations that occur between target mobile station 113 and target base station 102.

One of the purposes of Page message 408 is to locate target mobile station 113. Locating MS 113 is done by transmitting Page message 408 to target MS 113 and MS 113 then transmitting Page Response message 409.

The present invention eliminates this by directly sending a short data burst message to target mobile station 113, rather than Page message 408. Then, target MS 113 acknowledges the SDB message by sending a Layer 2 (L2) Acknowledgment message. Target BS 102 may send a modified Page message to target MS 113. Target MS 113 may acknowledge the Page message by transmitting a Page Response message appended to (i.e., piggybacked onto) a Layer 2 Acknowledgement (L2 Ack) message or by transmitting only the L2 Acknowledgment message (if only the SDB message was sent). The present invention may be implemented by appropriate modification of the call stack software in control channel message controller 260 in BS 101, BS 102, and through BS 103 and by modifying control channel message controller program 362 in MS 111-MS 114.

Figure 5:
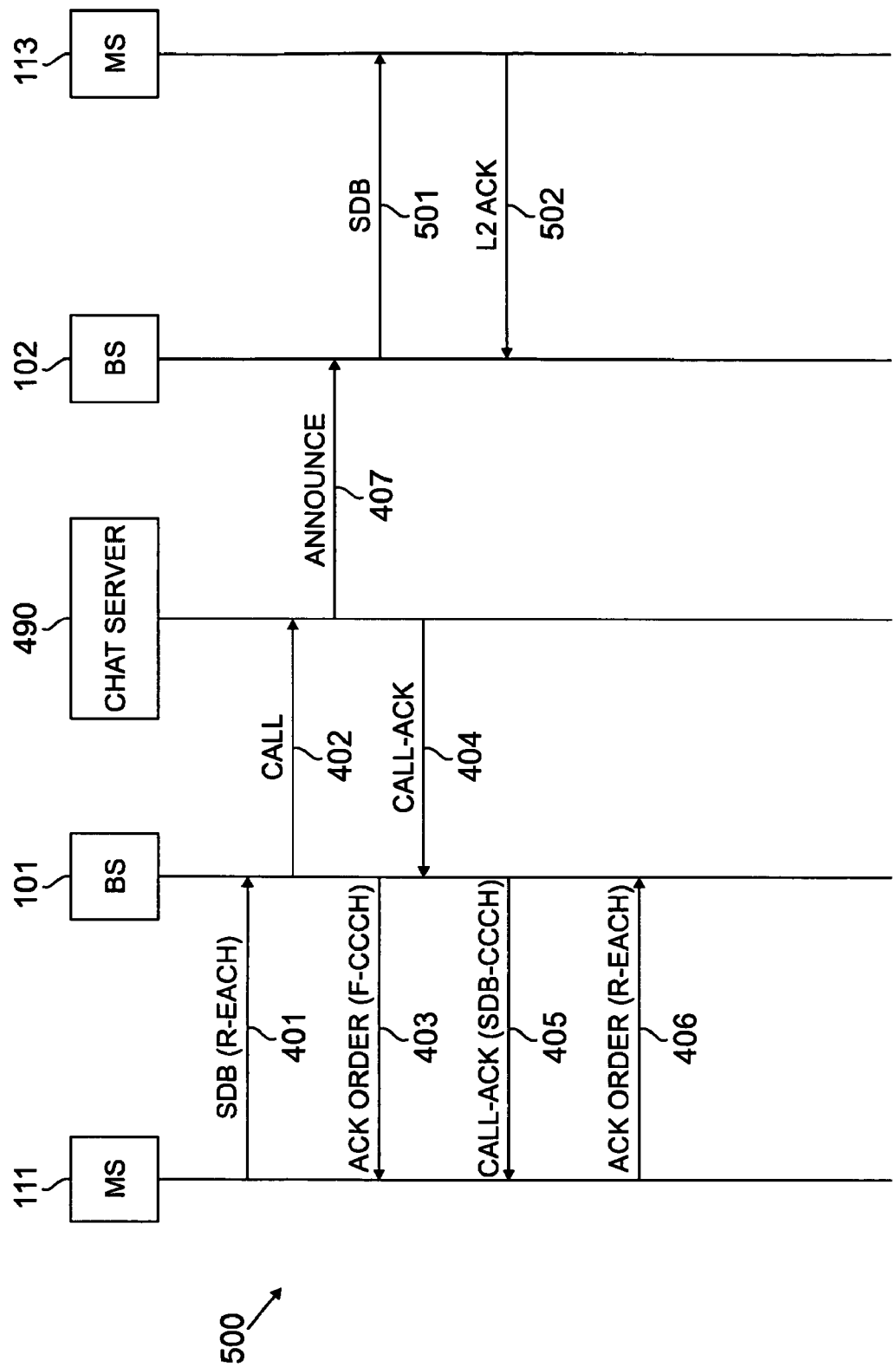
FIG. 5 is a flow diagram illustrating a call set-up operation according to a first embodiment of the present invention.

FIG. 5 depicts flow diagram 500, which illustrates a call set-up operation according to a first embodiment of the present invention. In FIG. 5, messages 401-407 are exchanged as in the prior art embodiment described in FIG. 4. However, messages 408-411 are eliminated and replaced by messages 501 and 502. As is shown, BS 102 sends short data burst (SDB) message directly 501 to MS 113, rather than sending a Page message and waiting for a Page Response message. Target MS 113 then responds to SDB message 501 by sending Layer 2 (L2) Acknowledgment message 502.

If the location and parameters (e.g., slot cycle index, SCM, channel capability information, etc.) of MS 113, which are normally conveyed in the Page Response message (PRM), are stored in MS information database 265 in BS 102, then BS 102 can directly send SDB message 502 in the idle state. Since the information MS 113 would normally send in the PRM is already known to BS 102, it is not necessary to transmit the PRM. MS 113 simply acknowledges SDB message 501 with L2 Acknowledgment message 502. Thus, the time required for the call set-up procedure is greatly reduced.

The above-described technique assumes that target base station 102 stores the necessary information regarding the parameters for MS 113. This enables the paging mechanism, especially the Page Response message, to be eliminated. The above-described technique also assumes that target base station 102 knows the whereabouts of target mobile station 113. In Release D of the CDMA2000 standard, a base station is capable of tracking a mobile station with techniques such as radio environment reporting (RER) and tracking zone (TKZ) mechanism. As a result, target BS 102 can locate target MS 113 by triggering either of these techniques, or some other well-known location determination technique.

Figure 6:
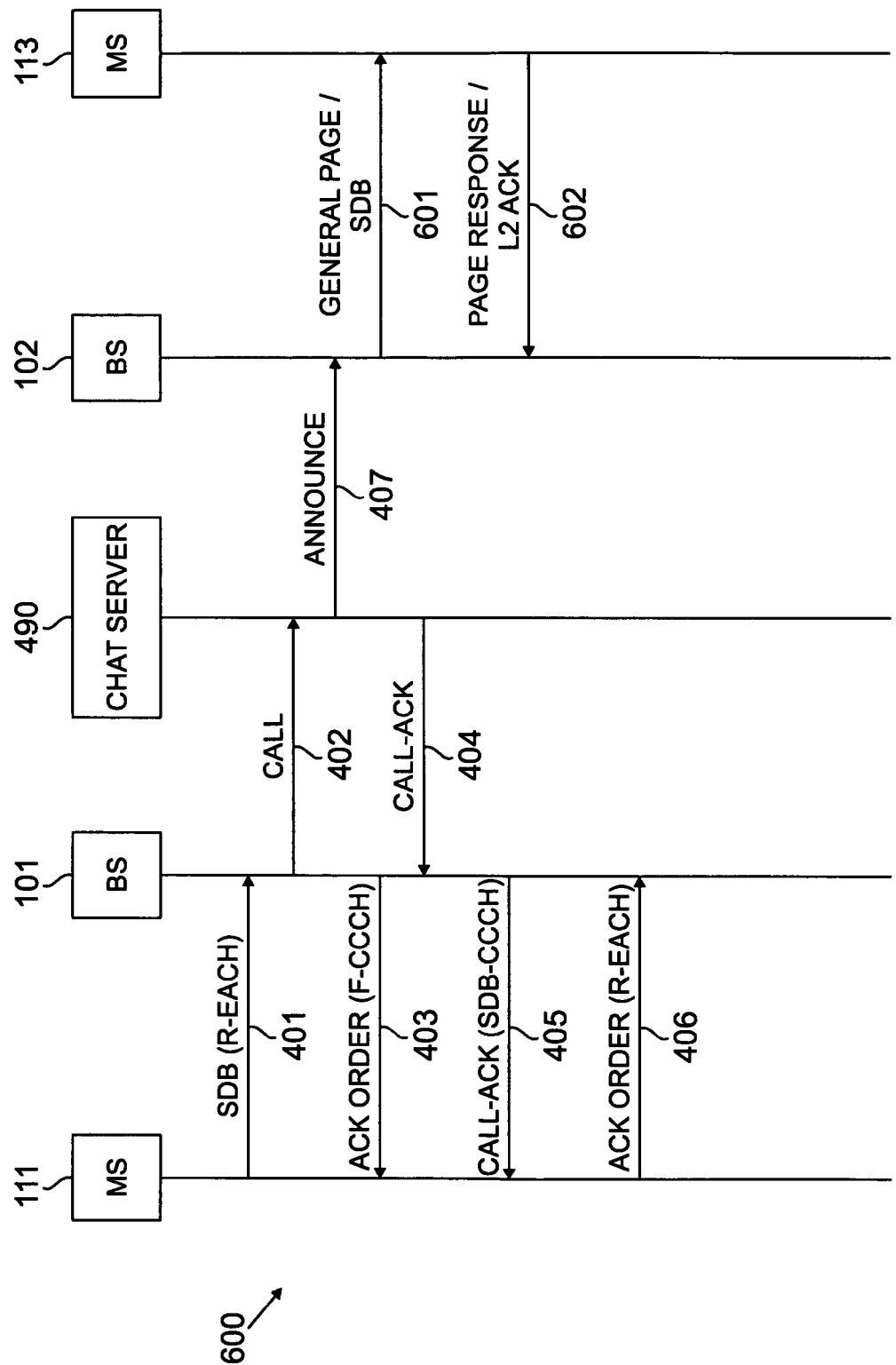
FIG. 6 is a flow diagram illustrating a call set-up operation according to a second embodiment of the present invention.

FIG. 6 depicts flow diagram 600, which illustrates a call set-up operation according to a second embodiment of the present invention. In the embodiment shown in FIG. 6, it is assumed that BS 102 does not know the parameter information for MS 113. In FIG. 6, messages 401-407 are exchanged as in the prior art embodiment described in FIG. 4. However, messages 408-411 are eliminated and replaced by messages 601 and 602. As is shown, BS 102 sends short data burst (SDE) message 601, which may include a modified Page message, to MS 113.

Target MS 113 then responds to Page/SDB message 601 by sending Layer 2 (L2) Acknowledgment message 602, which may have a Page Response message (PRM) appended (i.e., piggy-backed) to the L2 message. Mobile station 113 acknowledges message 601 with only L2 Acknowledgment message 602, if BS 102 sent only SDB message 601 without a modified Page message. If SDE message 601 included the modified Page message, then MS 113 replies with a modified Page message appended to SDE message 601.

Appending the modified Page message to SDE message 601 and appending the Page Response message to L2 Acknowledgment message 602 reduces the call setup-time, as in FIG. 5. Since the extra transactions of sending SDB message 601 and L2 Acknowledgment message 602 are concatenated with the Page message and the Page Response message, there is an extra savings of around 200-500 milliseconds over the prior art embodiment shown in FIG. 4.

FIG. 7 illustrates modified Page message 700 according to an exemplary embodiment of the present invention. Modified Page message 700 shows the packet data unit (PDU) format that is appended to short data burst (SDB) message 601. If ES 102 is not aware of all of the required parameters for MS 113, BS 102 sends modified Page message 700 in order to obtain certain required parameters. The length of each filed is given in bytes. Those skilled in the art will recognize that many of the fields in modified Page message 700 are similar to equivalent fields in conventional Page message 408.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a wireless network capable of communicating with mobile stations in a coverage area of the wireless network, a mobile station capable of reducing the call set-up time for a time-sensitive application, the mobile station comprising:

a message controller capable of receiving from a base station of the wireless network a short data burst message operable to initiate the time-sensitive application in the mobile station and determining if the short data burst message comprises a Page message requesting parameter information associated with the mobile station, wherein the message controller, in response to receipt of the short data burst message, transmits a Layer 2 Acknowledgment message responding to the short data burst message.

2. The mobile station as set forth in claim 1, wherein the short data burst message is received in a forward control channel of the wireless network.

3. The mobile station as set forth in claim 2, further comprising a memory, the memory capable of storing the message controller.

4. The mobile station as set forth in claim 1, wherein the message controller, in response to a determination that the short data burst message comprises a Page message requesting parameter information associated with the mobile station, is further capable of transmitting to the base station a Page Response message appended to the Layer 2 Acknowledgment message, wherein the Page Response message comprises the requested parameter information.

5. The mobile station as set forth in claim 4, wherein the requested parameter information comprises at least one of: a slot cycle index and a station class mark (SCM).

6. The mobile station as set forth in claim 1, wherein the wireless network comprises a code division multiple access (CDMA) network.

7. The mobile station as set forth in claim 1, wherein the time-sensitive application comprises a push-to-talk (PTT) application.

8. For use in a wireless network capable of communicating with mobile stations in a coverage area of the wireless network, a mobile station capable of reducing the call set-up time for a time-sensitive application, the mobile station comprising:

a processor; and
a message controller configured to:
receive from a base station of the wireless network a short data burst message, the short data burst message operable to initiate the time-sensitive application in the mobile station, the short data burst message comprising a modified Page message;
determine if the modified Page message requests parameter information associated with the mobile station; and
in response to receipt of the short data burst message, transmit a Layer 2 Acknowledgment message responding to the short data burst message.

9. The mobile station as set forth in claim 8, wherein the short data burst message is received in a forward control channel of the wireless network.

10. The mobile station as set forth in claim 9, further comprising a memory, the memory capable of storing the message controller.

11. The mobile station as set forth in claim 8, wherein the message controller, in response to a determination that the modified Page message requests parameter information associated with the mobile station, is further configured to transmit to the base station a Page Response message appended to the Layer 2 Acknowledgment message, wherein the Page Response message comprises the requested parameter information.

12. The mobile station as set forth in claim 11, wherein the requested parameter information comprises at least one of: a slot cycle index and a station class mark (SCM).

13. The mobile station as set forth in claim 8, wherein the wireless network comprises a code division multiple access (CDMA) network.

14. The mobile station as set forth in claim 8, wherein the time-sensitive application comprises a push-to-talk (PTT) application.

15. For use in a wireless network capable of communicating with mobile stations in a coverage area of the wireless network, a method for reducing the call set-up time for a time-sensitive application, the method comprising:

receiving from a base station of the wireless network a short data burst message, the short data burst message operable to initiate the time-sensitive application in a mobile station, the short data burst message comprising a modified Page message;

determining if the modified Page message requests parameter information associated with the mobile station; and in response to receipt of the short data burst message, transmitting a Layer 2 Acknowledgment message responding to the short data burst message.

16. The method as set forth in claim 15, wherein the short data burst message is received in a forward control channel of the wireless network.

17. The method as set forth in claim 15, further comprising the step of:

in response to a determination that the modified Page message requests parameter information associated with the mobile station, transmitting to the base station a Page Response message appended to the Layer 2 Acknowledgment message, wherein the Page Response message comprises the requested parameter information.

18. The mobile station as set forth in claim 17, wherein the requested parameter information comprises at least one of: a slot cycle index and a station class mark (SCM).

19. The mobile station as set forth in claim 15, wherein the wireless network comprises a code division multiple access (CDMA) network.

20. The mobile station as set forth in claim 15, wherein the time-sensitive application comprises a push-to-talk (PTT) application.

\* \* \* \* \*